June 4, 1963  A. WEIGEL  3,092,272
AUTOMATIC STRAW AND CHAFF SAVER
Filed Nov. 29, 1961  4 Sheets-Sheet 1
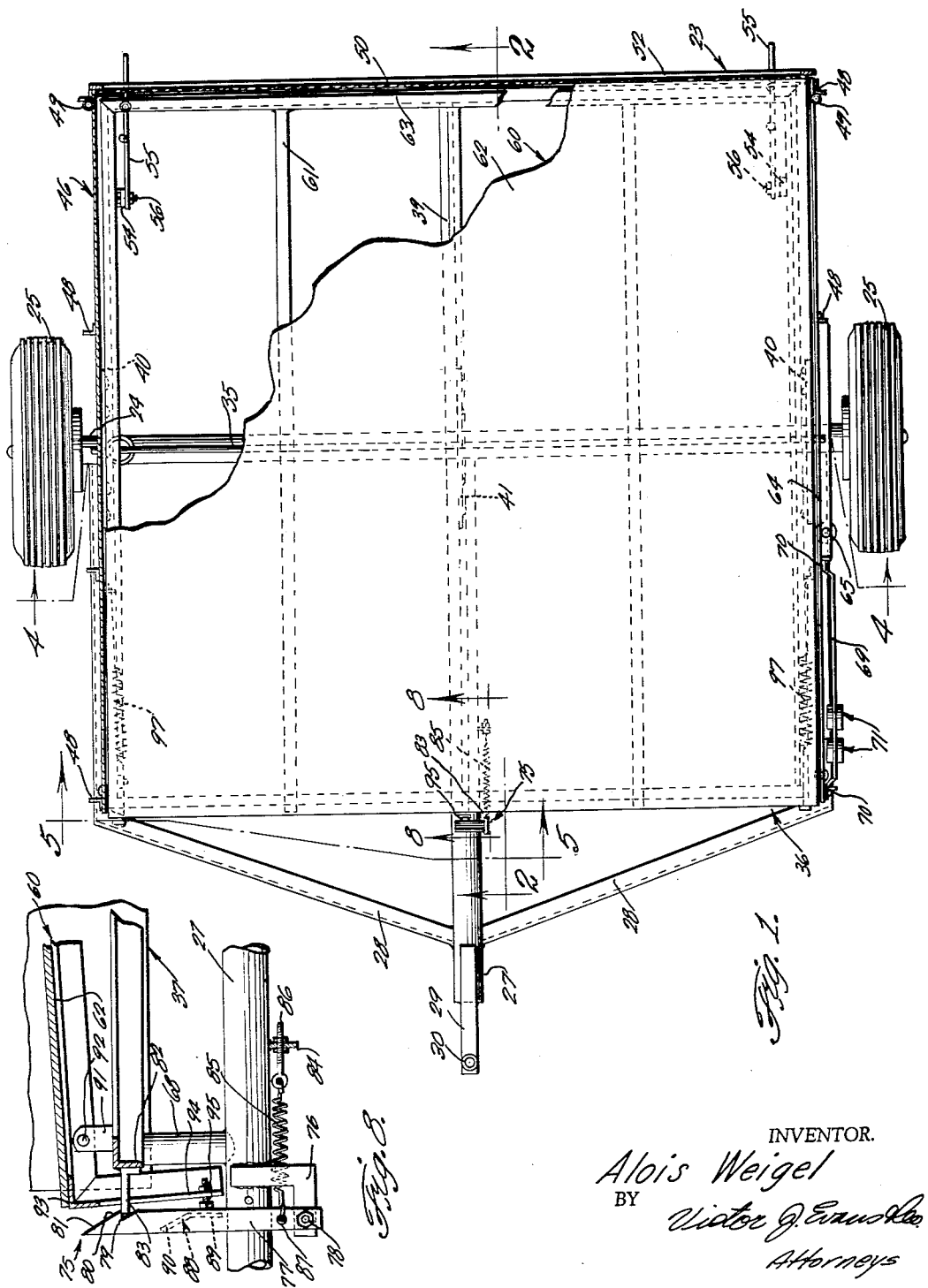
INVENTOR.
Alois Weigel
BY
Victor J. Evanoske
Attorneys

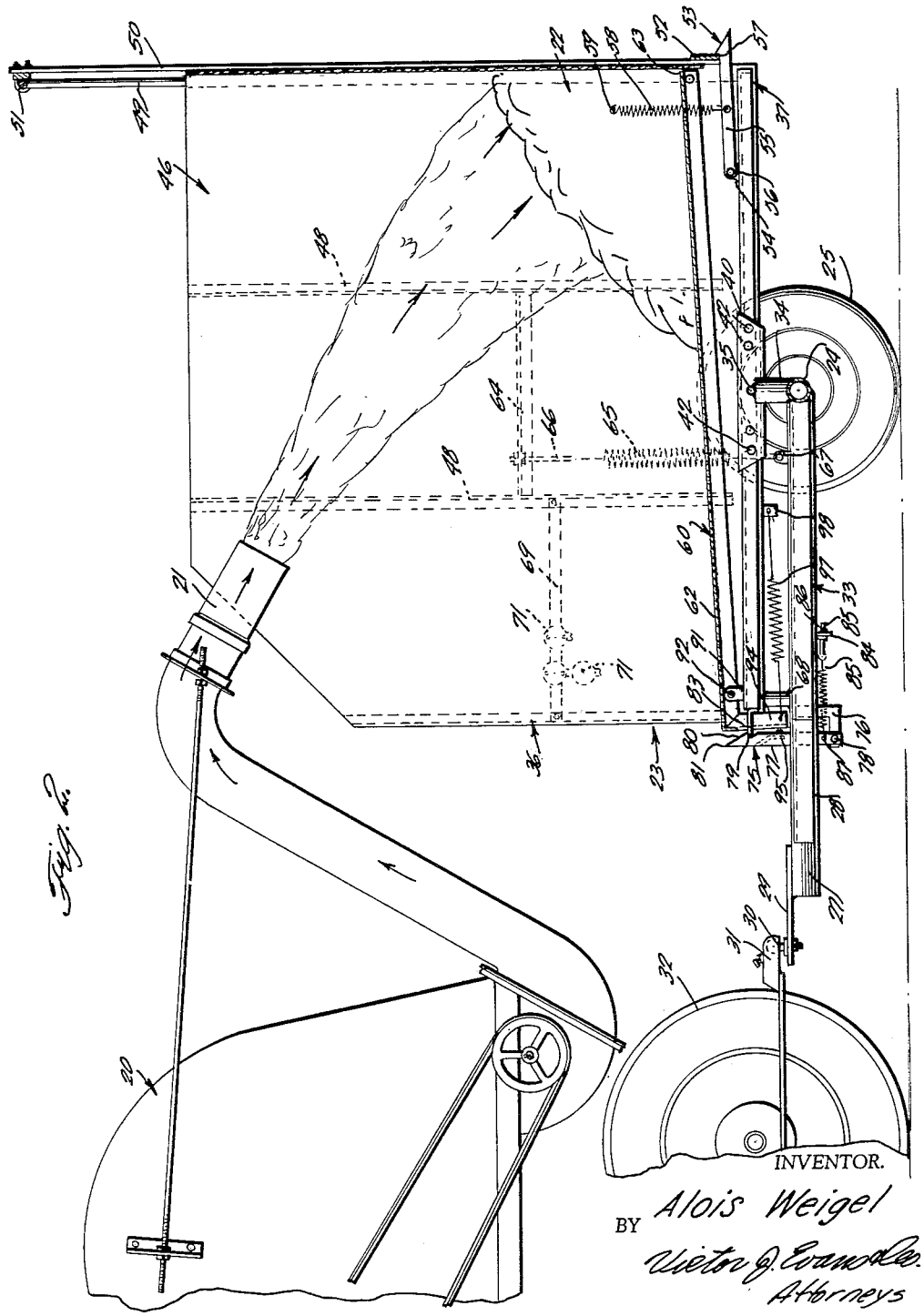

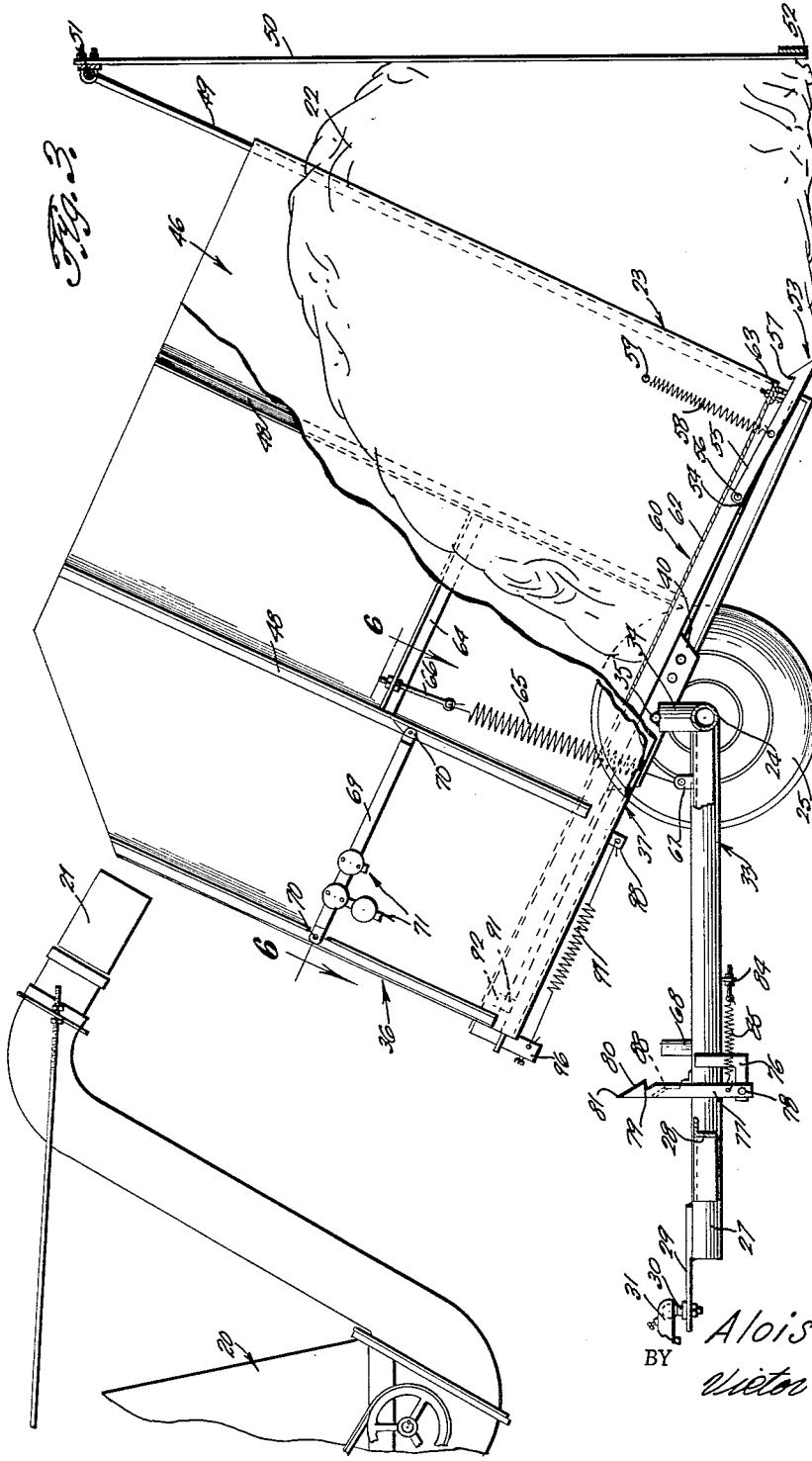

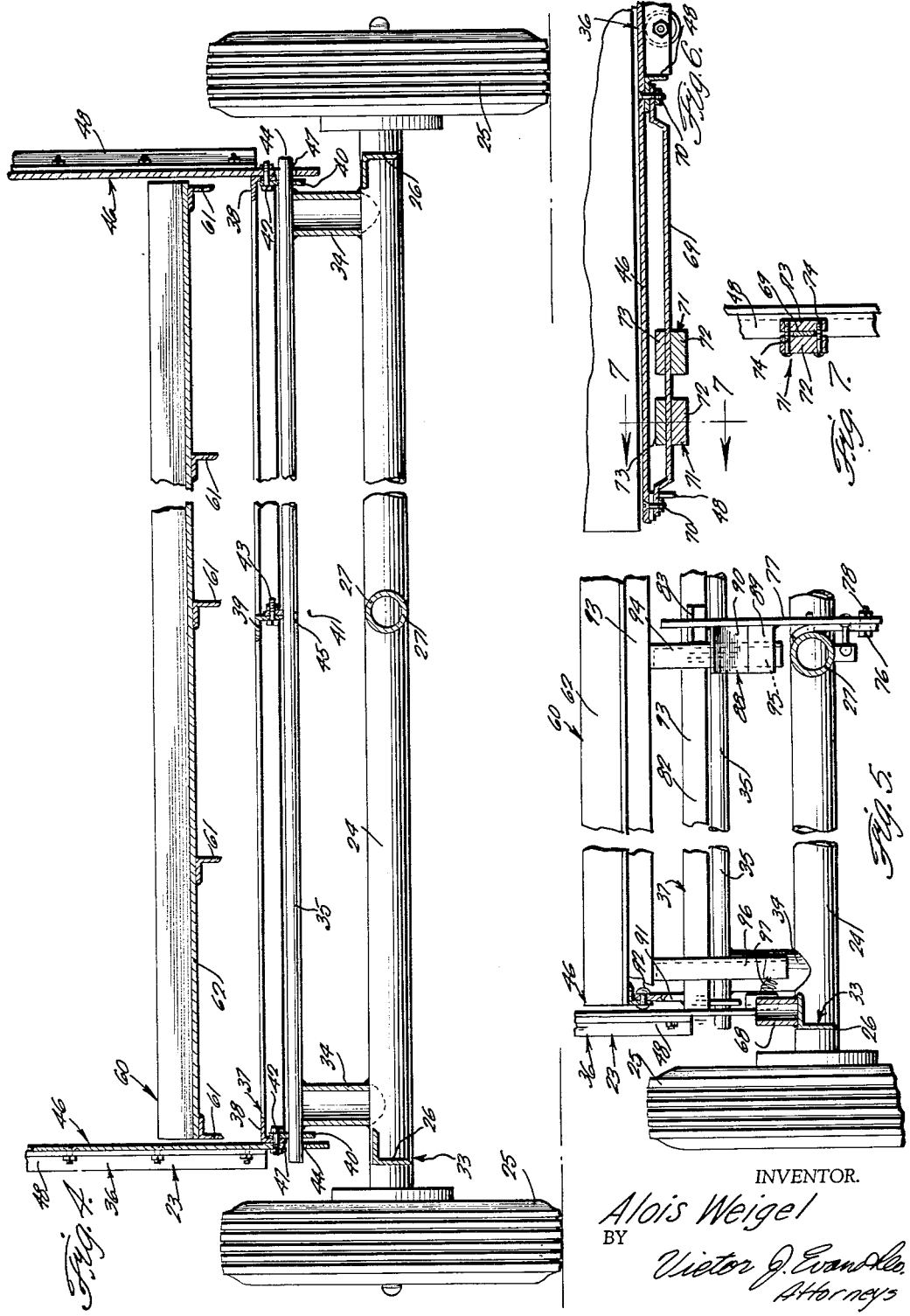

United States Patent Office 3,092,272
Patented June 4, 1963

3,092,272
AUTOMATIC STRAW AND CHAFF SAVER
Alois Weigel, Napoleon, N. Dak.
Filed Nov. 29, 1961, Ser. No. 155,648
1 Claim. (Cl. 214—501)

This invention relates to a device for receiving and automatically dumping chaff, straw and the like which is discharged from a combine or harvester, whereby the chaff and straw can be deposited on the ground in piles.

An important object of the present invention is to provide a wheeled unit or vehicle which is adapted to be attached to and mounted rearwardly of a combine so that the straw and chaff which is discharged from the usual discharge chute of the combine will be received in the device of the present invention, whereby when a sufficiently heavy load is received in the device, a mechanism will be automatically actuated to dump the material into a pile on the ground.

A further object of the present invention is to provide a device of the character described which is constructed so that the straw and chaff will be automatically dumped in piles along the ground, so that the piles of material can be subsequently collected and used for any desired purpose, and wherein the present invention is adjustable so that it can be made to be actuated for loads of different sizes or weights as desired or required.

A further important advantage or object of the present invention is that it may be quite simply and cheaply produced in quantity to permit the general use thereof.

These and many other objects and advantages of the invention will become apparent to those versed in the art in the following description of one particular form of the invention as illustrated in the accompanying drawings, in which:

FIGURE 1 is a top plan view of the straw and chaff saver of the present invention, with parts broken away and in section.

FIGURE 2 is a sectional view taken on the line 2—2 of FIGURE 1.

FIGURE 3 is a side elevational view, with parts broken away and in section, showing the body in dumping position, whereas FIGURE 2 shows the body in loading position.

FIGURE 4 is a sectional view taken on the line 4—4 of FIGURE 1.

FIGURE 5 is a sectional view taken on the line 5—5 of FIGURE 1.

FIGURE 6 is a sectional view taken on the line 6—6 of FIGURE 3.

FIGURE 7 is a sectional view taken on the line 7—7 of FIGURE 6.

FIGURE 8 is an enlarged sectional view taken on the line 8—8 of FIGURE 1.

Referring in detail to the drawings, the numeral 20 indicates a portion of a conventional combine or harvester which includes the usual rearwardly disposed discharge chute 21 that is adapted to discharge straw, chaff or the like as indicated by the numeral 22, FIGURE 2. According to the present invention there is provided a straw and chaff saver which is indicated generally by the numeral 23, and the device 23 is shown to comprise a horizontally disposed shaft or axle 24 which has a pair of ground engaging wheels 25 connected thereto. The numeral 33 indicates a chassis which comprises a pair of horizontally disposed spaced parallel beams 26 that have their rear ends suitably affixed to the axle 24, and the numeral 27 indicates a horizontally disposed tubular member or tongue which has its rear end affixed as by welding to the axle 24. Angularly arranged brace pieces 28 are secured to or formed integral with the front end portions of the beams 26, and the front portions of the brace pieces 28 are secured as by welding to the tongue 27. The numeral 29 indicates a support piece which is suitably affixed to the upper front portion of the tongue 27, and a ball member 30 is mounted on the support piece 29, FIGURE 2. The ball member 30 is adapted to be attached or connected to a hitch 31 on the rear portion of the combine 20, the numeral 32 indicating the usual rearwardly disposed wheels on the combine 20.

Extending upwardly from the axle 24 and secured thereto as by welding is a pair of vertically disposed spaced parallel support members 34, and the numeral 35 indicates a pivot rod which is horizontally disposed, and the rod 35 is secured as by welding to the upper portions of the support members 34, FIGURE 4.

The numeral 36 indicates a pivotally mounted body of the device 23, and the body 36 includes a lower frame which is indicated generally by the numeral 37, and the frame 37 includes a pair of spaced apart outer bars 38 as well as an inner bar 39. Plates or gussets 40 and 41 are affixed to the bars 38 and 39 as at 42 and 43, FIGURE 4, and these plates 40 and 41 are provided with registering apertures 44 and 45 through which extend portions of the rod 35 as shown in the drawings.

The body 36 includes the pair of spaced parallel vertically disposed side walls 46 which have their lower ends connected to the bars 38 as at 42, and the lower portions of the side walls 46 have registering openings 47 therein for the projection therethrough of the rod 35. A plurality of spaced apart upstanding brace elements 48 are suitably affixed to the side walls 46. The front of the body 36 is open.

As shown in FIGURE 3 for example, upstanding arms 49 are affixed to the rear portions of the side walls 46, and an end gate 50 has its upper portion hingedly connected to the arms 49 as at 51, and the end gate 50 may have a reinforced strip 52 on the lower portion thereof.

There is further provided a latch means which is indicated generally by the numeral 53, and the latch means 53 is adapted to be used for selectively maintaining the end gate 50 in closed position relative to the rear end of the body member 36. As shown in the drawings the latch means 53 comprises lugs 54 which are suitably affixed to the upper rear portion of the bars 38, and levers or keepers 55 are pivotally connected to the lugs 54 as at 56. The keepers 55 are provided with shoulders 57 for engaging the lower edge portion of the end gate 50, as for example when the parts are in the position of FIGURE 2. Spring members 58 have their lower ends connected to the keepers 55, and the upper ends of the spring members 58 are connected to the side walls 46 as at 59, FIGURE 3.

The numeral 60 indicates a bottom section or floor section which is movably mounted in the lower portion of the body 36, whereby the bottom section 60 is mounted for relative movement towards and away from the frame 37. The bottom section 60 includes a plurality of spaced parallel frame pieces 61 which have a base member or bottom wall 62 affixed thereto in any suitable manner, FIGURE 4. The bottom section 60 further includes a rearwardly disposed crosspiece 63 which is adapted to selectively engage the keepers 55 when load on the bottom section 60 is sufficiently heavy, as later described in this application.

As shown in the drawings, cross elements or brace elements 64 are suitably affixed to the side walls 46 of the body 36, and coil springs or spring members 65 have their upper ends connected to the cross elements 64 as at 66, while the lower ends of the spring members 65 are anchored to lugs 67 on the beams 26.

The numeral 68 indicates stop members on the beams 26 for limiting downward pivotal movement of the body 36 in a counter clockwise direction, FIGURES 3 and 4.

There is further provided brackets 69 which are affixed to the side walls 46 as at 70, FIGURE 6, and adjustable counterweights 71 are supported on or mounted on the brackets 69. These counterweights 71 include segments or separate parts 72 and 73 which are adapted to be joined together by securing elements 74, FIGURE 7. Thus, by loosening the securing elements 74, the counterweights 71 can be adjusted to a desired position along the brackets 69 in order to permit the counterweights to be used for controlling operation of the present invention in the desired manner or at the proper time.

As shown in FIGURE 8, there is provided a locking means which is indicated generally by the numeral 75, and the locking means 75 is adapted to be used for selectively maintaining the body 36 in loading position, as for example as shown in FIGURE 2. The locking means 75 includes a generally L-shaped support element 76, which is secured as by welding to the tongue 27, and the numeral 77 indicates an upstanding lever or retainer which has its lower end pivotally connected to the support element 76 as at 78. The retainer 77 is provided with a recess 79 therein wherein there is defined in the upper portion of the retainer 77 a lip 80, and the upper portion of the retainer 77 is beveled or inclined as at 81.

The frame 37 further includes a forwardly arranged crosspiece 82 which has a finger 83 secured thereto as by welding, and the finger 83 is adapted to engage the recess 79 and lip 80. A lug 84 depends from the tongue 27, FIGURE 8, and a coil spring or spring member 85 has its rear end connected as at 86 to the lug 84, and the front end of the spring member 85 is connected as at 87 to the lower portion of the retainer 77. The numeral 88 indicates a bracket that is secured as by welding to the retainer 77, and the bracket 88 includes a lower portion 89 as well as an upper inclined portion 90, and the portion 90 is arranged angularly with respect to the lower portion 89.

Affixed to the upper front portion of the frame 37 is spaced parallel lugs 91, and certain of the bars 61 of the bottom section 60 are pivotally or hingedly connected to the lugs 91 as at 92. The bottom section 60 is provided with a forwardly arranged cross beam or crosspiece 93, and a leg 94 depends from the intermediate portion of the cross beam 93 and is suitably affixed thereto, FIGURE 5. The numeral 95 indicates a pusher or stud which is connected to the leg 94, and the pusher 95 is adapted to selectively engage the bracket 88, as for example as shown in FIGURE 8.

Spaced apart standards or bars 96 depend from the front portion of the bottom section 60, and these standards 96 have spring members 97 connected thereto, the rear portions of the spring members 97 being connected to lugs 98 which depend from the frame 37.

From the foregoing, it is apparent that there has been provided a straw and chaff saver, and in use with the parts arranged as shown in the drawings, it will be seen that the straw and chaff saver 23 of the present invention is adapted to be arranged rearwardly of a conventional combine such as the combine 20 whereby as the combine 20 moves along a field of growing crops or grain or the like, the chaff and straw will be blow out or discharged out through the chute 21 into the wagon or device 23. The device 23 is adapted to be connected to the combine 20 as for example by means of the hitch elements 31 and 30 so that as the combine 20 moves along the field, the device 23 will be towed therebehind. The wheels 25 permit the device 23 to move along the field in the desired manner, and it is to be noted that the chassis 33 remains in a horizontal position, but the body 36 is pivotally or rockably mounted so that for example it can move to and from a loading position such as that shown in FIGURE 2 to a dumping position such as that shown in FIGURE 3.

When the device is in loading position as shown in FIGURE 2, the straw and chaff as indicated by the numeral 22 is discharged out from the chute 21 into the interior of the body 36, and at this time the end gate 50 is in closed position relative to the rear end of the body 36. The end gate 50 is maintained in locked or closed position by means of the latch means 53 which includes the keepers 55 that are provided with the shoulders 57 for engaging the lower edge portion of the end gate 50, and springs 58 serve to normally urge or bias the keepers 55 to a counter-clockwise direction, FIGURES 2 and 3, so that the shoulders 57 will maintain the end gate 50 in closed position relative to the rear end of the body 36.

Also, with the parts in the position of FIGURE 2 the locking means 75 serve to maintain the body 36 locked to the chassis 33 due to the provision of the parts illustrated in the figures such as in FIGURE 8. Thus, the locking means 75 includes the retainer 77 which is pivotally connected as at 78 to the stationary bracket 76 on the tongue 27, and the retainer 77 is provided with the recess 79 and lip 80 for selective engagement by the finger 83 on the front end of the frame 37. Thus, with the parts in the position of FIGURES 2 or 8, the finger 83 is engaged below the lip 80 so that the body 36 cannot rock or pivot in a clockwise direction from the position shown in FIGURE 2.

The mechanism 75 remains in locking position, and latch means 53 remains in locking or holding position until the load of material 22 on the bottom section 60 reaches a predetermined weight or size. When the material 22 is sufficiently heavy on the bottom section 60, the bottom section 60 pivots downwardly in a clockwise direction, FIGURE 2, and the bottom section 60 pivots on an axis extending through the pivot pins 92 so that the rear portion of the bottom section 60 can move towards the rear portion of the frame 37, and as the bottom section 60 pivots in a clockwise direction, its rearwardly disposed crosspiece 63 moves downwardly into engagement with the keepers 55 to overcome the holding force of the springs 58 so that the shoulders 57 are below and out of engagement with the lower edge of the end gate 50 whereby the end gate 50 can swing open as for example from the position shown in FIGURE 2 to the position shown in FIGURE 3, and the hinges 51 permit this opening or swinging movement of the end gate 50 to take place, whereby with the body 36 in dumping position as shown in FIGURE 3, the material 22 can automatically dump out of the body 36 onto the ground to be subsequently retrieved or collected in any desired manner. Thus, the present invention forms neat and convenient piles of straw and chaff that is in a convenient location along the field instead of permitting the straw and chaff to blow out the chute 21 onto the ground in random or helter-skelter fashion.

It is to be noted that when the material 22 reaches the predetermined weight or size, the locking means 75 is released so as to permit the body 36 to pivot or tilt from a position shown in FIGURE 2 to the position shown in FIGURE 3, and the body 36 tilts or rocks about an axis extending through the rod 35. The releasing of the locking means 75 takes place as follows. As the weight of the material 22 forces the bottom section 60 downwardly, the leg 94 is moved in a clockwise direction, FIGURE 8, whereby since the pusher 95 is connected to the leg 94, the pusher 95 will be moved in a direction corresponding to the direction of movement of the leg 94, so that the pusher 95 will move into engagement with the portion 89 of the bracket 88, and the bracket 88 is secured as by welding to the retainer 77. Thus, the engagement of the pusher 95 with the bracket 88 will cause the retainer 77 to be pivoted in a counter-clockwise direction, FIGURE 8, so that the retainer 77 will be pivoted in a counter-clockwise direction about an axis extending through the pin 78, and this counter-clockwise pivotal movement of the retainer 77 will move the lip 80 rearwardly to permit the finger 83 to clear the recess 79 and lip 80 whereby with the load 22 in the rear portion of the body 36, the body 36 will tilt or rock to the position shown in FIGURE 3 from the position shown in FIGURE 2, and with the end gate 50 open, the material 22 will automatically dump to form a pile of material on the ground.

The springs 65 function as the return springs for helping to return or pivot the body 36 from the position shown in FIGURE 3 to the position shown in FIGURE 2, after the load 22 has been dumped. Thus, the springs 65 have their lower ends connected as at 67 to the chassis 33, while the upper ends of the springs 65 are connected as at 66 to the element 64 of the body 36 so that the springs 65 can stretch or expand in order to permit the dumping to take place as shown in FIGURE 3, and after the load 22 has been dumped or emptied, the inherent resilience of the springs 65 helps return the body 36 to loading position as shown in FIGURE 2. When the body 36 returns to loading position as shown in FIGURE 2 from the position shown in FIGURE 3, the locking mechanism 75 is automatically operated or actuated whereby the locking mechanism 75 will serve to maintain the body 36 in the position of FIGURE 2 until the load 22 again reaches a predetermined size or weight. The counterweights help return the body 36 from the position shown in FIGURE 3 to the position shown in FIGURE 2 after the load has been emptied, and these counterweights 71 are adjustably mounted so that they can be shifted back and forth on the member 69 in order to provide a means for varying the pivotal or rocking action of the body 36 so that for example the body 36 can be made to dump or pivot for different weights of material 22 as desired or required. To shift the weights 71, the screws or securing elements 74 can be loosened whereby the weights 71 can be adjusted to the desired position, and then the securing elements 74 can be tightened to maintain the weights 71 immobile in their adjusted position. Also, the elements 66 are adapted to be adjusted to provide a means for varying the tension or force exerted by the spring 65 and this provides an additional means for adjusting the pivotal or rocking action of the body 36.

The spring 85 serves to normally urge or bias the retainer 77 in a clockwise direction relative to the pivot pin 78, FIGURE 8, so that the necessary or desired locking action between the recess 79 and lip 80 and finger 83 can take place. However, when the load 22 is sufficiently heavy, the bottom section 60 will be pivoted on its pivot axis 92 whereby the pusher 95 will push against the brackets 88 to pivot the retainer 77 in a counter-clockwise direction relative to an axis extending through the pivot pin 78 so that the holding action or force exerted by the spring 85 can be overcome in order to permit the finger 83 to move free or clear of the lip 80 and recess 79. The element 86 provides a means for adjusting the tension or force exerted by the spring 85. The springs 97 are anchored as at 98 to the frame 37, and these springs 97 are also anchored or connected to the standards 96 on the cross beam 93 of the bottom section 60 so that the springs 97 function to assist in raising the bottom section 60 after the load 22 has been dumped. Thus, the springs 97 help return the bottom section 60 to loading position by urging or biasing the bottom section 60 to pivot in a counter-clockwise direction about an axis extending through the pins 92 after the load is dumped, so that the bottom section 60 will be automatically returned to starting or loading position ready to receive other quantities of material 22 thereon.

The parts can be made of any suitable material and in different shapes or sizes.

The device of the present invention is adapted to be attached behind a combine and functions to save straw, sprouts, and the like. The discharge chute 21 is adapted to be of the type which can be adjusted up or down whereby the material 22 issuing or discharging from the chute 21 can be properly directed into the interior of the body 36.

Primarily, the vehicle 23 is to catch the straw and chaff as it leaves the combine harvester, and there is provided the weights and spring means which function cooperatively with the other parts whereby the load is dumped in the field upon reaching its load weight. Immediately after the load has been dumped, the body member again assumes its normal position for reloading. After the dumps or piles of material have been left on the ground, the dumps or piles can be subsequently picked-up and hauled to the farm yard to be used for feed or bedding or the like.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as defined in the appended claim.

What is claimed is:

A straw and chaff saver comprising a horizontally disposed chassis including a pair of spaced parallel beams, an axle connected to the rear ends of said beams, ground engaging wheels connected to said axle, a horizontally disposed tongue affixed to said axle, a pair of spaced parallel vertically disposed support members affixed to said axle, a horizontally disposed rod affixed to said support members; a tiltable body including a frame having a pair of outer bars and intermediate bar and said bars having plates connected thereto, said plates having registering apertures therein for the projection therethrough of said rod, said body further including a pair of spaced parallel vertically disposed side walls which have their lower portions affixed to said outer bars, spaced apart arms affixed to the rear portions of said side walls, an end gate having its upper portion hingedly connected to said arms, latch means for said end gate, and said latch means comprising spring pressed keepers having shoulders thereon for selectively engaging the lower portion of the end gate, a bottom section in the lower portion of said body and said bottom section including a plurality of spaced apart frame pieces and a base member mounted on said frame pieces and affixed thereto, said bottom section further including a rearwardly disposed crosspiece for engaging the keepers when the load on the bottom section reaches a predetermined weight, cross elements affixed to said side walls, spring members having their upper portions connected to said cross elements and their lower portions anchored to said beams; a plurality of adjustable counterweights connected to said body; locking means for said body, and said locking means comprising a support element affixed to said tongue, a retainer having its lower end pivotally connected to said support element, there being a recess in said retainer defining a retaining clip, a finger connected to the front portion of said frame for selectively engaging said recess and lip, a lug depending from said tongue, a spring member having its rear end anchored to said last named lug and its front end connected to said retainer, a bracket affixed to said retainer, a leg depending from the front portion of said bottom section, a pusher on said leg for engaging said last named bracket, and pivot pins pivotally connecting the front portion of the bottom section to the front portion of the frame.

References Cited in the file of this patent

UNITED STATES PATENTS

| 952,670 | Fryman | Mar. 22, 1910 |
| 1,078,468 | Sumwalt | Nov. 11, 1913 |
| 1,588,681 | Haney | June 15, 1926 |
| 1,786,560 | Burrows et al. | Dec. 30, 1930 |
| 2,047,500 | Walker et al. | July 14, 1936 |